US010574733B2

(12) United States Patent
Dinan et al.

(10) Patent No.: US 10,574,733 B2
(45) Date of Patent: Feb. 25, 2020

(54) TECHNOLOGIES FOR HANDLING MESSAGE PASSING INTERFACE OPERATIONS

(71) Applicant: Intel Corporation, Santa Clara, CA (US)

(72) Inventors: James Dinan, Hudson, MA (US); Mario Flajslik, Hudson, MA (US); Keith D. Underwood, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 14/858,051

(22) Filed: Sep. 18, 2015

(65) Prior Publication Data

US 2017/0085625 A1    Mar. 23, 2017

(51) Int. Cl.
*H04L 29/08* (2006.01)
*H04L 12/863* (2013.01)
*H04L 12/743* (2013.01)

(52) U.S. Cl.
CPC .......... *H04L 67/10* (2013.01); *H04L 45/7453* (2013.01); *H04L 47/6245* (2013.01)

(58) Field of Classification Search
CPC . H04L 67/10; H04L 45/7453; H04L 47/6245; G06F 9/00
See application file for complete search history.

(56) References Cited

U.S. PATENT DOCUMENTS

| 6,125,399 A * | 9/2000 | Hamilton ................ H04L 29/06 370/392 |
| 7,203,768 B2 * | 4/2007 | Olsen .................. H04L 12/1881 370/400 |
| 7,984,180 B2 * | 7/2011 | Pope ..................... H04L 45/742 370/392 |

(Continued)

OTHER PUBLICATIONS

Thakur et al., "Optimation of Collective Communication Operations in MPICH", International Journal of High Performance Computing Applications (IJHPCA), Spring 2005, vol. 19, No. 1, pp. 49-66.

(Continued)

*Primary Examiner* — Philip J Chea
*Assistant Examiner* — Robert B McAdams
(74) *Attorney, Agent, or Firm* — Barnes & Thornburg LLP

(57) ABSTRACT

Technologies for handling message passing interface receive operations include a compute node to determine a plurality of parameters of a receive entry to be posted and determine whether the plurality of parameters includes a wildcard entry. The compute node generates a hash based on at least one parameter of the plurality of parameters in response to determining that the plurality of parameters does not include the wildcard entry and appends the receive entry to a list in a bin of a posted receive data structure, wherein the bin is determined based on the generated hash. The compute node further tracks the wildcard entry in the posted receive data structure in response to determining the plurality of parameters includes the wildcard entry and appends the receive entry to a wildcard list of the posted receive data structure in response to tracking the wildcard entry.

23 Claims, 11 Drawing Sheets

(56) References Cited

U.S. PATENT DOCUMENTS

| | | | | |
|---|---|---|---|---|
| 8,116,312 B2* | 2/2012 | Riddoch | ............... | H04L 49/90 370/389 |
| 2010/0205611 A1* | 8/2010 | Wagner | ............... | G06F 9/524 719/313 |
| 2013/0312011 A1* | 11/2013 | Kumar | ............... | G06F 9/546 719/314 |

OTHER PUBLICATIONS

"No wildcards", downloaded from https://svn.mpi-forum.org/trac/mpi-forum-web/ticket/461.

Zounmevo et al., "An Efficient MPI Message Queue Mechanism for Large-scale Jobs", Proc. IEEE 18th Intl. Conf. on Parallel and Distributed Systems (ICPADS), Dec. 17-19, 2012.

Aulwes et al., "Architecture of LA_MPI, a network-fault-tolerant MPI", Proc. 18th Intl. Parallel and Distributed Processing Symposium, Apr. 26-30, 2004.

Underwood et al., "A Hardware Acceleration Unit for MPI Queue Processing", Proc. 19th IEEE Intl. Paralleland Distributed Processing Symposium, Apr. 4-8, 2005.

Mattheakis er al., "Significantly Reducing MPI Intercommunication Latency and Power Overhead in Both Embedded and HPC Systems" ACM Trans. Architec. Code Optim. 9, 4, Article 51 (Jan. 2013), 25 pages.

* cited by examiner

TECHNOLOGIES FOR HANDLING MESSAGE PASSING INTERFACE OPERATIONS

BACKGROUND

The Message Passing Interface (MPI) is a standardized system for passing messages between compute nodes or processes in parallel computing systems. MPI defines point-to-point message ordering between two processes based on the matching criteria of MPI messages: a user-supplied tag, sender process (i.e., the source rank), and a communicator identifier (e.g., context ID). MPI is generally deterministic except that nondeterminism may arise when wildcards are used and messages are received from multiple senders. MPI message processing engines typically split message processing into two separate structures: a first for handling posted receive operations and a second for handling unexpected messages. In particular, if a received message does not match a previous posted receive, the message is unexpected and therefore may be stored in that data structure. The FIFO-like semantic and presence of wildcards, for example, often draw MPI implementations toward storing posted receive operations and unexpected messages in single message queues, implemented as linked lists that are ordered from oldest to newest.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
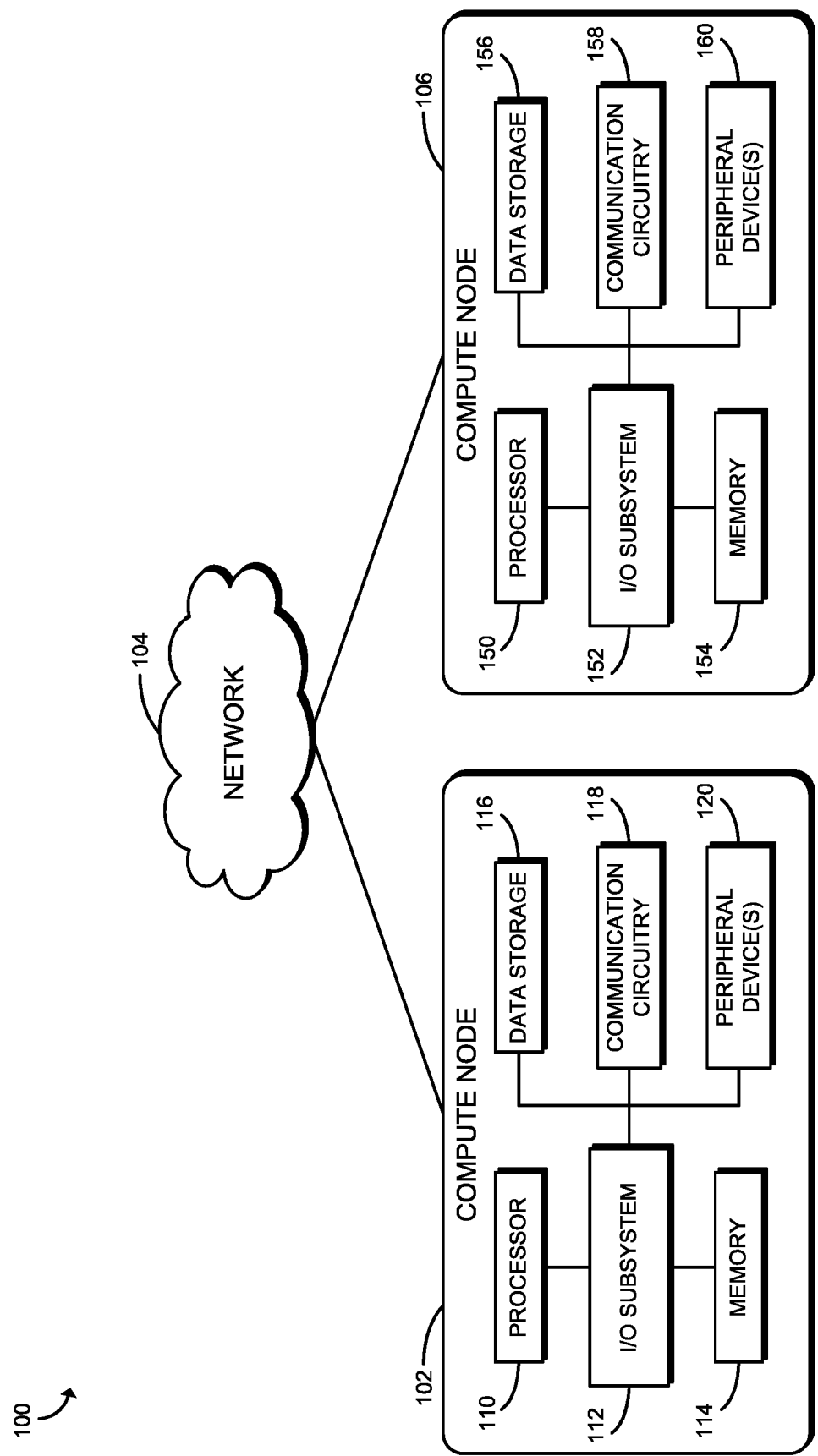
FIG. 1 is a simplified block diagram of at least one embodiment of a system for handling message passing interface (MPI) operations.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for handling message passing interface (MPI) operations includes a compute node 102, a network 104, and a compute node 106. Although only one compute node 102, one network 104, and one compute node 106 are illustratively shown in FIG. 1, the system 100 may include any number of compute nodes 102, 106 and/or networks 104 in other embodiments. As described in detail below, in the illustrative embodiment, the system 100 utilizes data structures that capture a weak, partial ordering required to satisfy MPI message ordering semantics while performing fast searches, for example, to match incoming messages against posted receive operations. In particular, the partial ordering of posted receive operations is maintained through various mechanisms. For example, posted receive entries with the same hash value are stored in the same list as described below. Further, ordering relative to wildcard receive operations is maintained by appending sentinel wildcard markers and/or counters to the lists.

The illustrative compute node 102 may be embodied as any type of computing device capable of performing the functions described herein. For example, the compute node 102 may be embodied as a server, a rack-mounted server, a blade server, desktop computer, laptop computer, tablet computer, notebook, netbook, Ultrabook™, cellular phone, smartphone, personal digital assistant, mobile Internet device, wearable computing device, Hybrid device, and/or any other computing/communication device. As shown, the illustrative compute node 102 includes a processor 110, an input/output ("I/O") subsystem 112, a memory 114, a data storage 116, a communication circuitry 118, and one or more peripheral devices 120. Of course, the compute node 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments. Further, in some embodiments, one or more of the illustrative components may be omitted from the compute node 102 (e.g., one or more of the peripheral devices 120).

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the compute node 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the compute node 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the compute node 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the compute node 102 as described herein. For example, the compute node 102 may store a post receive data structure 210 and an unexpected message data structure 212 as described herein.

The communication circuitry 118 may be embodied as any communication circuit, device, or collection thereof, capable of enabling communications between the compute node 102 and other remote devices (e.g., the compute node 106) over a network (e.g., the network 104). The communication circuitry 118 may be configured to use any one or more communication technologies (e.g., wireless or wired communications) and associated protocols (e.g., Ethernet, Bluetooth®, Wi-Fi®, WiMAX, LTE, 5G, etc.) to effect such communication. In some embodiments, the communication circuitry 118 is configured to perform high-speed communication (e.g., in a high performance compute (HPC) cluster) with another compute node 106.

The peripheral devices 120 may include any number of additional peripheral or interface devices, such as speakers, microphones, additional storage devices, and so forth. The particular devices included in the peripheral devices 120 may depend on, for example, the type and/or intended use of the compute node 102.

The network 104 may be embodied as any type of communication network capable of facilitating communication between the compute node 102 and remote devices (e.g., the compute node 106). As such, the network 104 may include one or more networks, routers, switches, computers, and/or other intervening devices. For example, the network 104 may be embodied as or otherwise include one or more high-speed networks, cellular networks, telephone networks, local or wide area networks, publicly available global networks (e.g., the Internet), an ad hoc network, or any combination thereof.

The compute node 106 may be embodied as any type of computing device capable of performing the functions described herein. For example, in some embodiments, the compute node 106 may be similar to the compute node 102 as described above. That is, compute node 106 may be embodied as a server, a rack-mounted server, a blade server, desktop computer, laptop computer, tablet computer, notebook, netbook, Ultrabook™, cellular phone, smartphone, personal digital assistant, mobile Internet device, wearable computing device, Hybrid device, and/or any other computing/communication device.

As shown in FIG. 1, the illustrative compute node 106 includes a processor 150, an I/O subsystem 152, a memory 154, a data storage 156, a communication circuitry 158, and one or more peripheral devices 160. Of course, the compute node 106 may include other or additional components, such as those commonly found in a typical computing device (e.g., various input/output devices and/or other components) in other embodiments. Additionally, in some embodiments, one or more of the illustrative components may be incorporated in, or otherwise form a portion of, another component. In some embodiments, the components of the compute node 106 are similar to the corresponding components of the compute node 102 described above. As such, the description of those comments is not repeated herein for clarity of the description. It should be appreciated that, in some embodiments, the system 100 may form a portion of a single computing device such that two processes of the same device can communicate with one another via MPI.

Figure 2:
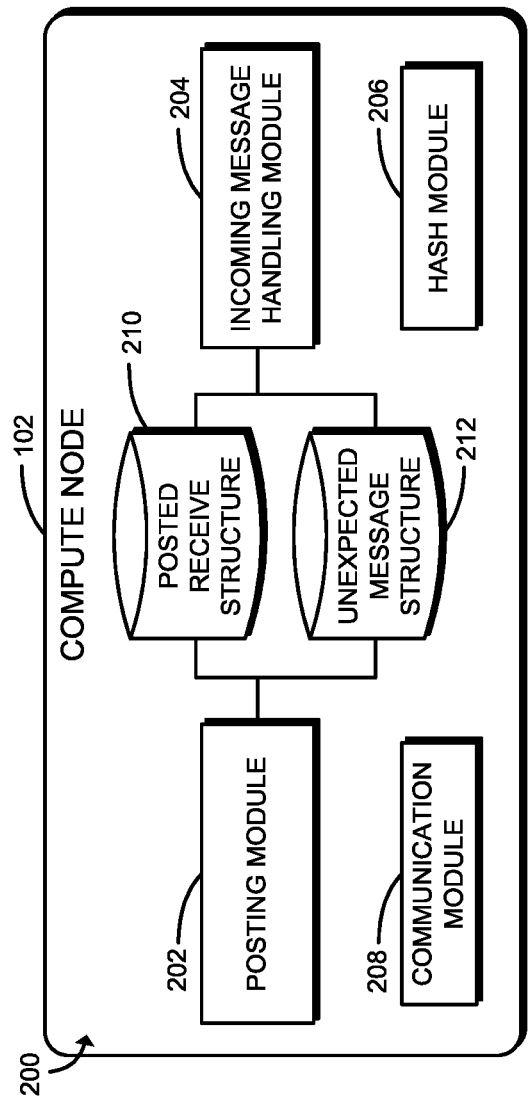
FIG. 2 is a simplified block diagram of at least one embodiment of an environment of a compute node of the system of FIG. 1.

Referring now to FIG. 2, in use, the compute node 102 establishes an environment 200 for handling message passing interface operations. The illustrative environment 200 includes a posting module 202, an incoming message handling module 204, a hash module 206, and a communication module 208. The various modules of the environment 200 may be embodied as hardware, software, firmware, or a combination thereof. For example, the various modules, logic, and other components of the environment 200 may form a portion of, or otherwise be established by, the processor 110 or other hardware components of the compute node 102. As such, in some embodiments, one or more of the modules of the environment 200 may be embodied as a circuit or collection of electrical devices (e.g., a posting circuitry, an incoming message handling circuitry, a hash circuitry, and/or a communication circuitry). Additionally, in some embodiments, one or more of the illustrative modules may form a portion of another module and/or one or more of the illustrative modules may be independent of one another.

The posting module 202 is configured to handle the posting of "receives" for messages expected to be received by the compute node 102 (e.g., via an MPI_Receive( ) function). As described herein, the posting module 202 may post the receive entries to a posted receive data structure 210. The illustrative posted receive data structure 210 includes a plurality of hash "bins" that are selected to store a particular posted receive entry based on a hash of the parameters of that receive entry. In the illustrative embodiment, each of the bins includes a linked list (e.g., a doubly-linked list) configured to store the corresponding "receive" entries. As described below, it should be appreciated that the hash function and/or parameters used may vary depending on the particular embodiment. In the illustrative embodiment, the posting module 202 uses markers, counters, and/or timestamps to provide ordering between wildcard entries and non-wild entries. Further, the illustrative posted receive data structure 210 includes a separate wildcard list/bin to store entries that have parameters with one or more wildcards. The posting module 202 may also be configured to search an unexpected message data structure 212, which stores messages that have been received prior to the posting of a corresponding receive entry. In particular, the posting module 202 may search the unexpected message data structure 212 to confirm that the compute node 102 has not already received a message corresponding with a receive entry to be posted before posting the receive entry to the posted receive data structure 210. It should be appreciated that, in some embodiments, the posted receive data structure 210 may be embodied as a data structure similar to the data structure 800 of FIG. 8, the data structure 900 of FIG. 9, or the data structure 1000 of FIG. 10 as described below.

The incoming message handling module 204 is configured to match a received message with the appropriate posted receive entry for processing. In particular, in the illustrative embodiment, the incoming message handling module 204 searches the posted receive data structure 210 and, if no matching receive entry is identified, the incoming message handling module 204 stores the message to the unexpected message data structure 212. In doing so, it should be appreciated that the incoming message handling module 204 may utilize the same hash function used by the posting module 202 to hash the parameters of the received message in order to efficiently identify a match for the message.

It should be appreciated that, in the illustrative embodiment, each MPI receive entry may be described by a three-tuple (c, s, t) in which the parameters correspond with a communicator, a source rank, and a tag, respectively. In some embodiments, the communicator is an integer identifier (e.g., context ID), the source rank is the rank of the sending process (e.g., the MPI address), and the tag is a user-defined tag. Further, in some embodiments, the source rank and/or the tag may be expressed as a wildcard (*) or "don't care" value. In other words, when performing matches, a wildcard value for a particular parameter matches all values for that parameter. It should be appreciated that MPI does not permit the communicator parameter to be expressed as a wildcard. In other embodiments, the communicator, tag, and source may form a portion of a field (e.g., a 64-bit field) such that one or more bits of the field may identified as wildcard bits (e.g., to wildcard the upper two bits or other subset of bits). In such embodiments, techniques similar to those described herein may be employed.

The hash module 206 is configured to generate hashes of receive entries to post and messages received from other processes or compute nodes 106. It should be appreciated that the hash module 206 may utilize any suitable hash algorithm for doing so. For example, in the illustrative embodiment, the hash module 206 may generate a hash of an entry according to hash(c,s,t)=(c+s+t)%bins, where c is the communicator value of the entry, s is the source rank value of the entry, t is the tag value of the entry, and bins is the number of bins in the posted receive data structure 210 (not including the wildcard list). Of course, the number of bins used may be configurable depending on the embodiment. As described herein, the compute node 102 appends the entry to a list in a particular bin depending on the generated hash value for that entry.

The communication module 208 handles the communication between the compute node 102 and other computing devices of the system 100 (e.g., the compute node 106). For example, as described herein, the compute node 102 may receive a message from a particular sender or process over the network 104.

Figure 3:
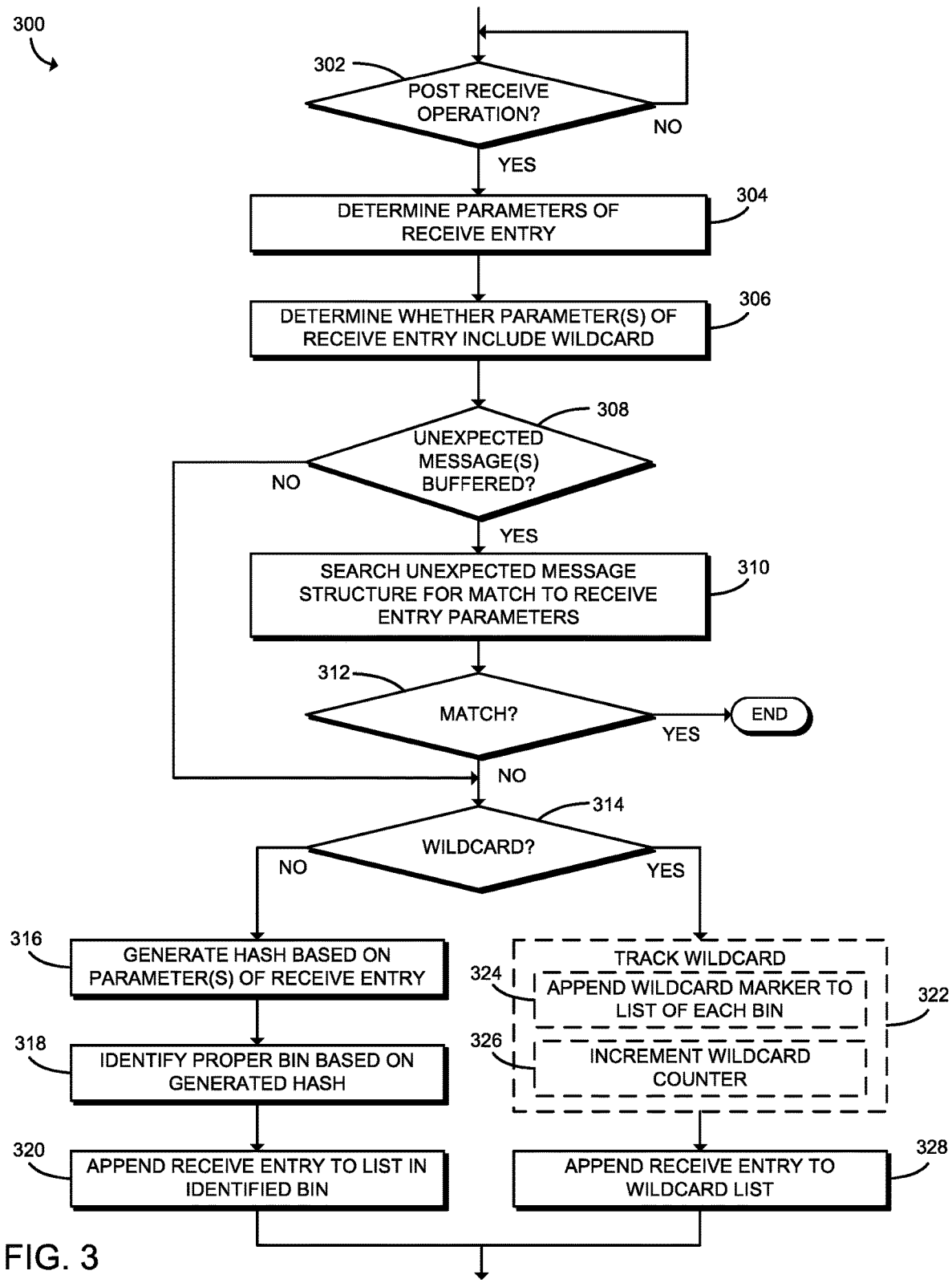
FIG. 3 is a simplified flow diagram of at least one embodiment of a method for performing a post of a receive operation.

Referring now to FIG. 3, in use, the compute node 102 may execute a method 300 for performing a post of a receive operation. The illustrative method 300 begins with block 302 in which the compute node 102 determines whether to perform a post of a receive operation. If so, in block 304, the compute node 102 determines the parameters of the receive entry to post. In particular, in the illustrative embodiment, the compute node 102 determines the values of the MPI communicator, source, and tag parameters. In block 306, the compute node 102 determines whether one or more of the parameters of the receive entry includes a wildcard. As indicated above, in some circumstances, a wildcard may be used for the source and/or tag parameter.

In block 308, the compute node 102 determines whether one or more unexpected messages have buffered. In other words, the compute node 102 determines whether the unexpected message data structure 212 is empty or not. If the compute node 102 determines that the unexpected message data structure 212 includes at least one entry (e.g., an unexpected message has been buffered), the compute node 102 searches the unexpected message data structure 212 to determine whether an entry of that data structure 212 has parameters that match the parameters of the receive entry in block 310. That is, the compute node 102 determines whether a message was previously sent that corresponds with the receive entry to post.

Figure 4:
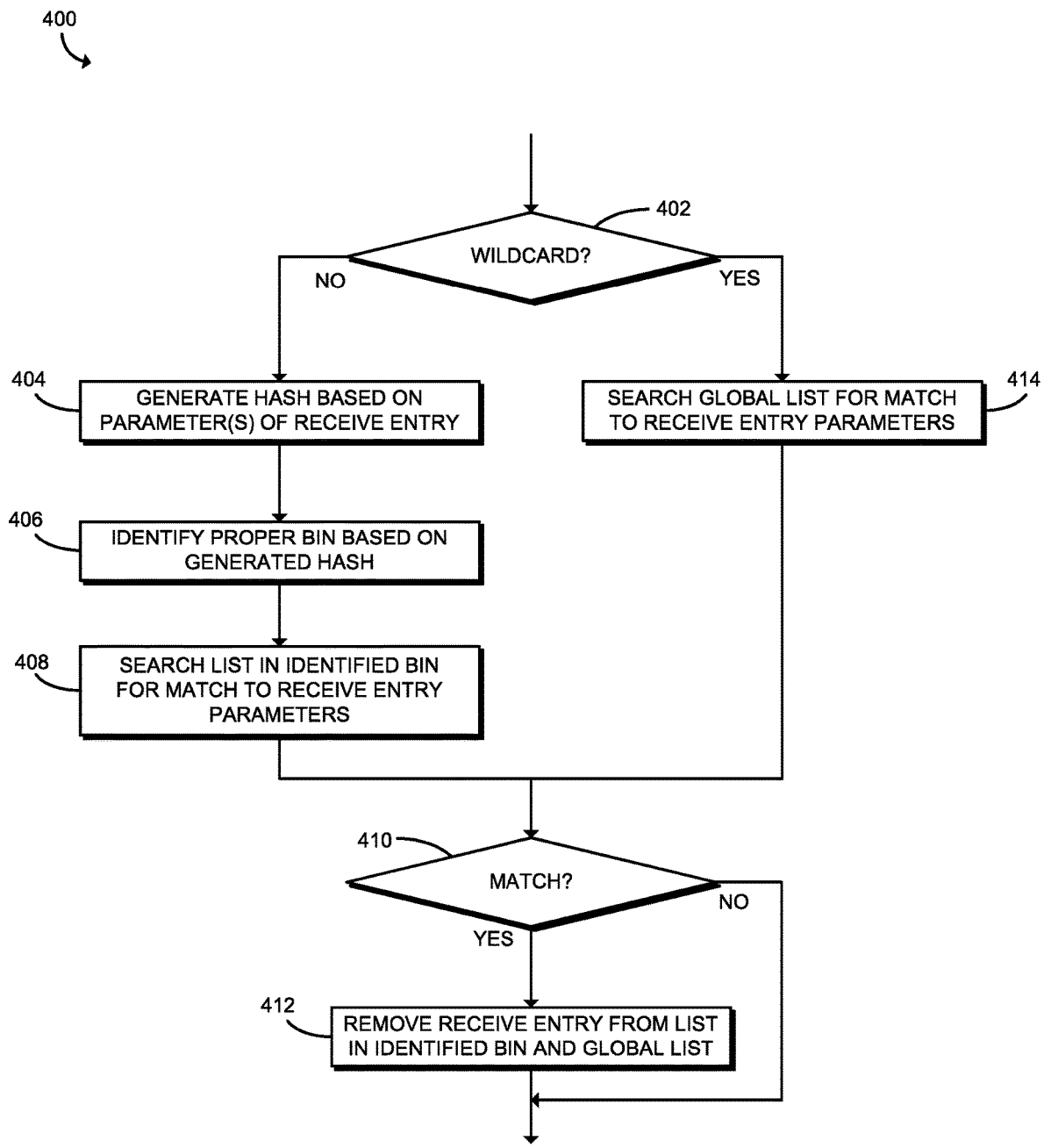
FIG. 4 is a simplified flow diagram of at least one embodiment of a method for searching an unexpected message data structure.
Figure 8:
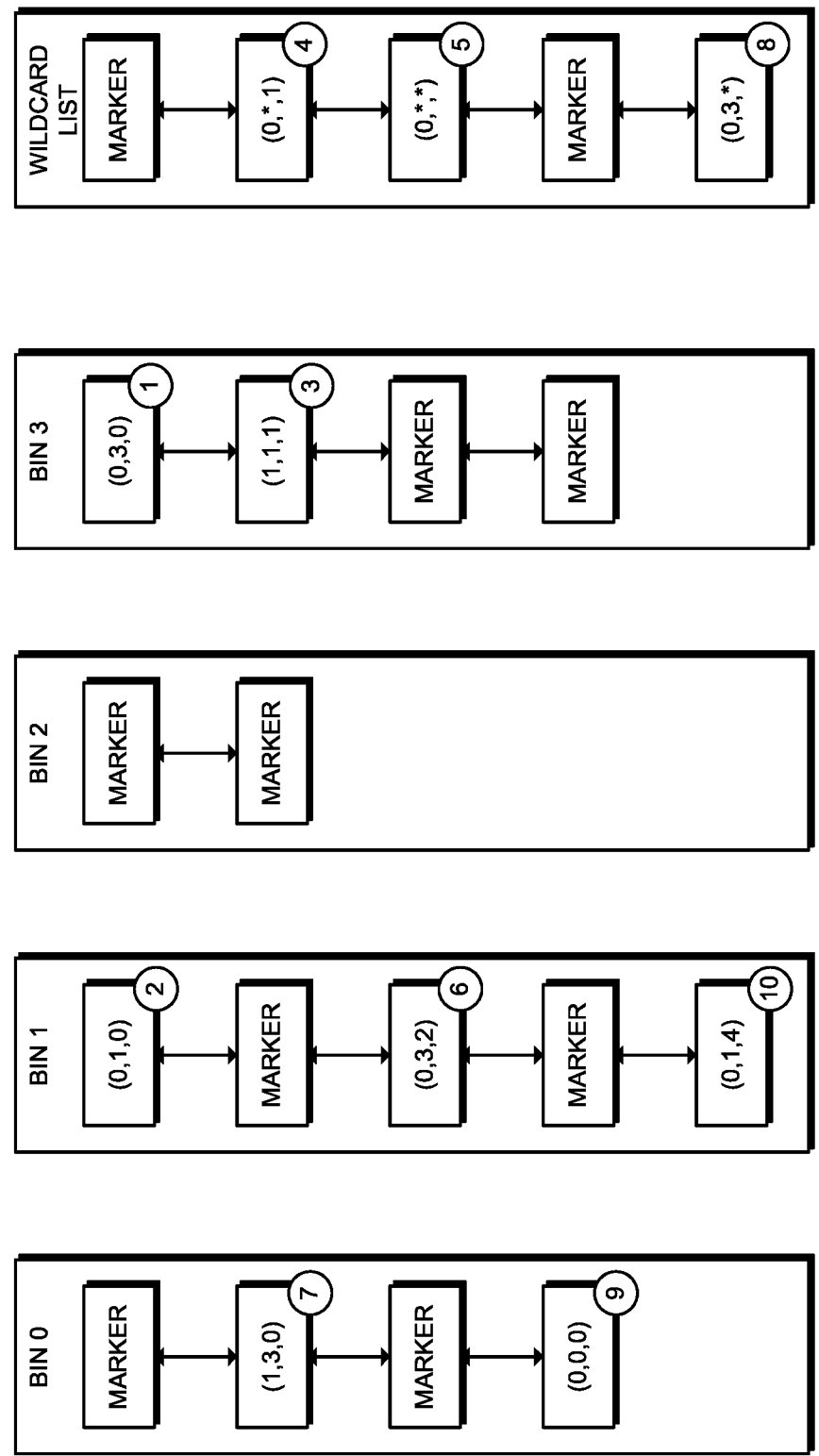
FIGS. 8-10 are simplified block diagrams of embodiments of a posted receive data structure.
Figure 9:
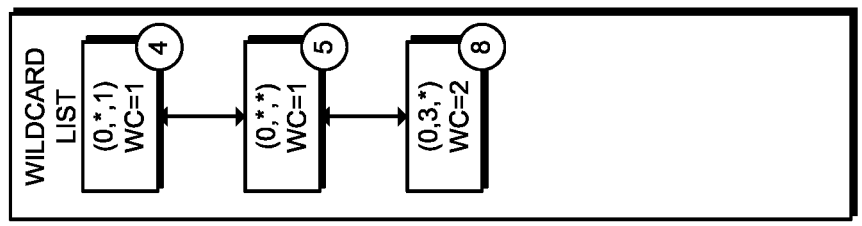
Figure 9:
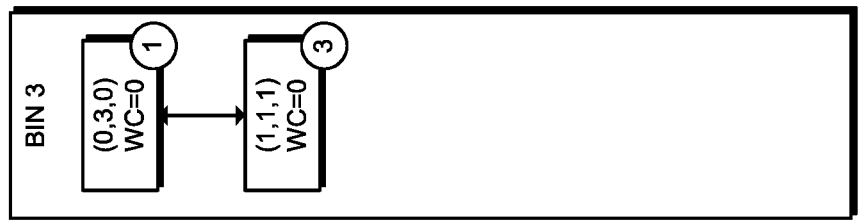
Figure 9:
Figure 9:
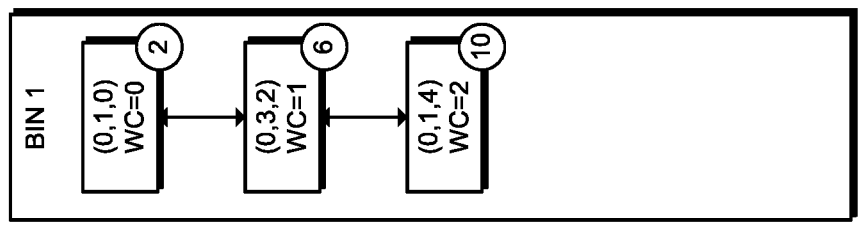
Figure 9:
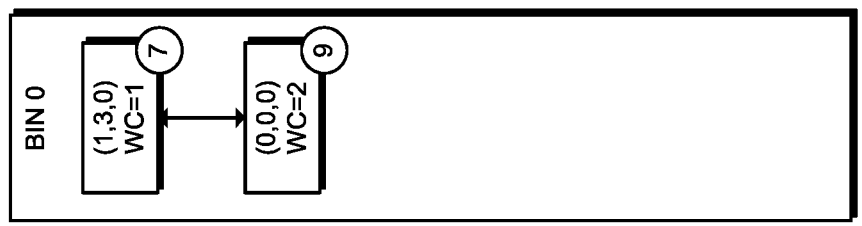

In some embodiments, the compute node 102 may execute a method 400 of FIG. 4 to search the unexpected message data structure 212. The illustrative method 400 begins with block 402 in which the compute node 102 determines whether any of the parameters of the receive entry includes a wildcard as indicated above. If not, the compute node 102 generates a hash based on one or more parameters of the receive entry in block 404. In particular, in the illustrative embodiment, the compute node 102 determines the number of bins in the posted receive data structure 210. For example, the posted receive data structure 210 may include four bins in addition to a wildcard list as shown in the embodiments of FIGS. 8-9. As indicated above, in some embodiments, the compute node 102 may determine the hash of the receive entry parameters according to hash(c,s,t)=(c+s+t)%bins, where c is the communicator value of the entry, s is the source rank value of the entry, t is the tag value of the entry, % is the modulo operator, and bins is the number of bins in the posted receive data structure 210. In another embodiment, such as embodiments in which the number of bins is a power of two, the compute node 102 may determine the hash according to hash(c,s,t)=(c+s+t)&bin_mask, where & is the "bitwise and" operator, and bin_mask is one less than the number of bins in the posted receive data structure (i.e., bin_mask=bins−1). Of course, it should be appreciated that the compute node 102 may utilize a different hash algorithm and/or a different number of bins in other embodiments. Further, in some embodiments, the compute node 102 may use fewer or additional parameters in computing the hash.

In block 406, the compute node 102 identifies the proper bin of the posted receive data structure 210 based on the generated hash. It should be appreciated that application of the hash algorithm to a particular receive entry or, more specifically, the parameters of that receive entry results in a selection of a single bin or bucket.

In block 408, the compute node 102 searches the list in the identified bin to determine whether any of the entries stored in that list match the receive entry. If, in block 410, the compute node 102 identifies a match, then in block 412 the compute node 102 removes the matched receive entry from the list in the identified bin and from a global list of the unexpected message data structure 212. Further, in some embodiments, the compute node 102 may "repair" the linked list (or other utilized data structure) as appropriate. As described in reference to the embodiment of FIG. 11, it should be appreciated that the unexpected message data structure 212 may include a set of hash bins with individual linked lists in addition to a global list that identifies the overall order in which the entries were appended to the unexpected message data structure 212. Returning to block 402, if the compute node 102 determines that the parameters of the receive entry include a wildcard, the compute node 102 searches the global list of the unexpected message data structure 212 to determine whether any of the entries stored in that list match the receive entry in block 414. As indicated above, in block 410, the compute node 102 determines whether there is a match and, if so, the compute node 102 removes the matched receive entry from the global list as well as from the bin within which it is stored.

Returning to FIG. 3, if the compute node 102 determines, in block 312, that the receive entry matched an entry stored in the unexpected message data structure 212, the method 300 may terminate. However, if the compute node 102 determines, in block 308, that the unexpected message data structure 212 is empty or determines, in block 312, that there is not a match for the receive entry in the unexpected message data structure 212, the method 300 advances to block 314 in which the compute node 102 determines whether the receive entry includes a wildcard parameter. Of course, it should be appreciated that, in some embodiments, the compute node 102 may rely on a previous determination (e.g., from block 306) regarding whether the parameters include a wildcard.

If the compute node 102 determines that there are no wildcards, the compute node 102 generates a hash based on the parameters of the receive entry in block 316. Of course, in some embodiments, the compute node 102 may rely on a previously generated hash (e.g., from block 404 of FIG. 4). In block 318, the compute node 102 identifies the proper bin of the posted receive data structure 210 based on the generated hash as described above. Further, in block 320, the compute node 102 appends the receive entry to the list in the identified bin. For example, in the illustrative embodiment, the list is constructed as a first-in, first-out (FIFO) list and the compute node 102 appends the receive entry to the tail/bottom of the list to preserve order.

Returning to block 314, if the compute node 102 determines that the parameters of the receive entry do include at least one wildcard, the compute node 102 may track the wildcard in block 322. To do so, in block 324, the compute node 102 may append a wildcard marker to the list of each of the bins in the posted receive data structure 210 (see, e.g., the data structure 800 of FIG. 8 described below). In some embodiments, in block 326, the compute node 102 may increment a wildcard counter to track the wildcard (see, e.g., the data structure 900 of FIG. 9 described below). In some embodiments, a wildcard counter values indicative of the state of the wildcard counter at the time of appending an entry to the corresponding list may be stored to each entry of the posted receive data structure 210 as a descriptor. It should be appreciated that, in some embodiments, the wildcard counter may experience overflow in which case the compute node 102 may resort to using wildcard markers. However, in implementations in which it is possible to use a large-valued representation (e.g., a 64-bit integer), overflow is highly unlikely. Further, as described herein, if the last posted entry was a wildcard entry, the compute node 102 may determine not to track the wildcard in some embodiments. For example, the compute node 102 may determine not to append a wildcard marker and/or increment a wildcard counter. In block 328, the compute node 102 appends the receive entry to the wildcard list (i.e., after tracking the wildcard, for example, by virtue of markers or a counter).

Figure 5:
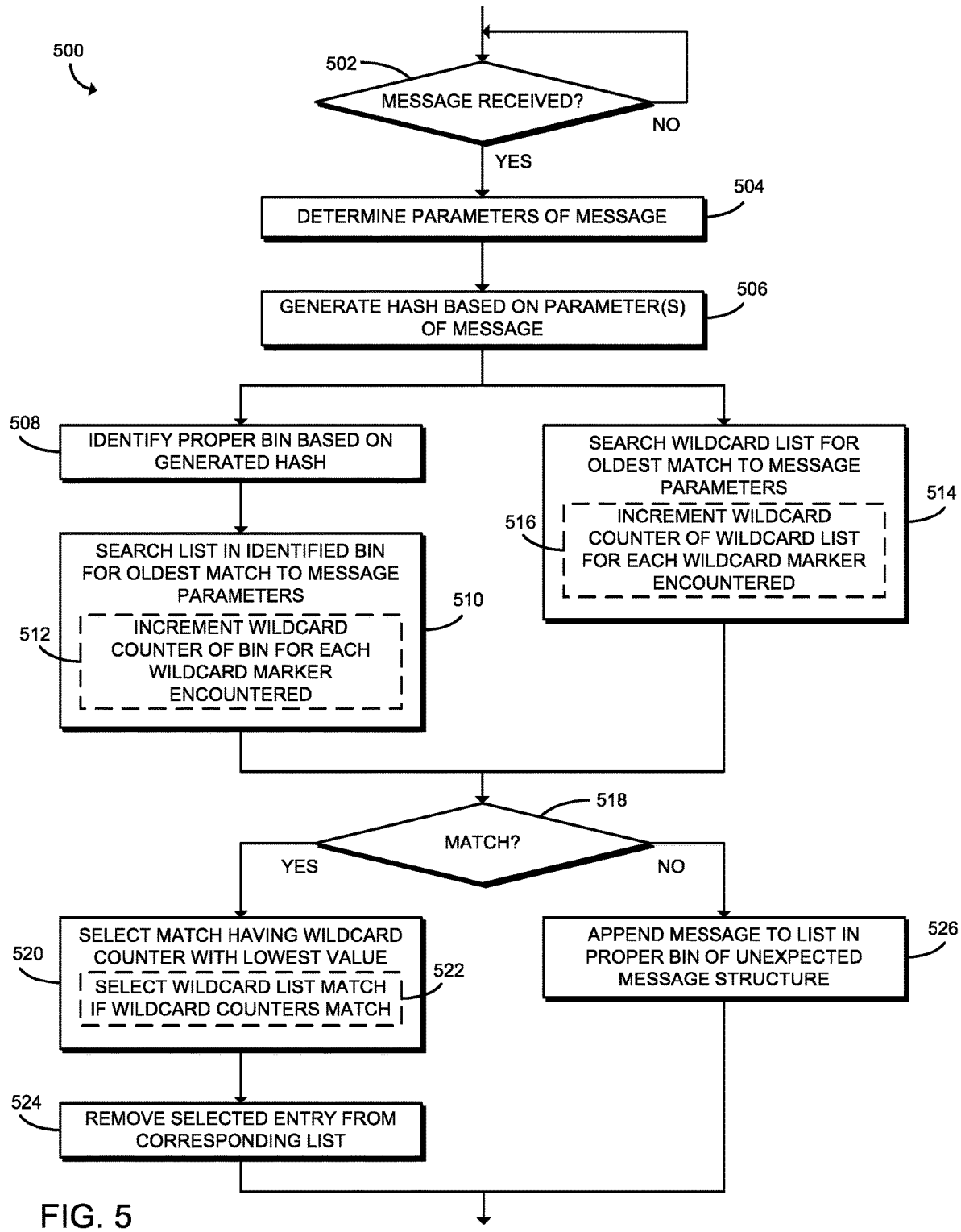
FIG. 5 is a simplified flow diagram of at least one embodiment of a method for processing a received message.

Referring now to FIG. 5, in use, the compute node 102 may execute a method 500 for processing a received message. The illustrative method 500 begins with block 502 in which the compute node 102 determines whether a message has been received (e.g., from the compute node 106 over the network 104). If so, the compute node 102 determines the parameters of the message in block 504. In block 506, the compute node 102 generates a hash based on one or more parameters of the message. It should be appreciated that, in the illustrative embodiment, the compute node 102 uses the same hash function to generate the hash as the function used in posting the receive entries described above in reference to FIG. 3.

As shown in FIG. 5, it should be appreciated that blocks 508-512 and blocks 514-516 may be executed in parallel; however, in other embodiments, those functions may be executed sequentially. In block 508, the compute node 102 identifies the proper bin of the posted received data structure 210 for the message based on the generated hash as described above. In block 510, the compute node 102 searches the list in the identified bin for the oldest match, if any, to the message parameters. In doing so, in block 512, the compute node 102 may increment a wildcard counter for that bin for each wildcard marker encountered before reading the entry associated with the oldest match. In block 514, the compute node 102 also searches the wildcard list of the posted receive data structure 210 for the oldest match, if any, to the message parameters. Further, in block 516, the compute node 102 may similarly increment a separate wildcard counter of the wildcard list for each wildcard marker encountered before reading the entry associated with the oldest match.

In block 518, the compute node 102 determines whether a match to the message was identified in the corresponding bin and/or wildcard list of the posted receive data structure 210. If so, the compute node 102 selects the match having the wildcard counter with the lowest value in block 522.

That is, if both the bin and the wildcard list include a match to the message, the compute node 102 selects the match having the lowest-valued wildcard counter. However, if only one of the bin and the wildcard list has identified a match, the compute node 102 selects that match, which is by default the lowest-valued match. Further, in block 522, if a match is identified in both the bin and the wildcard list and the wildcard counter values are equal, the compute node 102 selects the entry of the wildcard list that is a match. In block 524, the compute node 102 removes the selected entry from the corresponding list (i.e., the list of the bin or the wildcard list at which the match occurred). Returning to block 518, if the compute node 102 determines that no match has been identified in either the corresponding bin or the wildcard list of the posted receive data structure 210, the compute node 102 appends the message to the list in the proper bin (i.e., based on the hash) of the unexpected message data structure 212.

Figure 6:
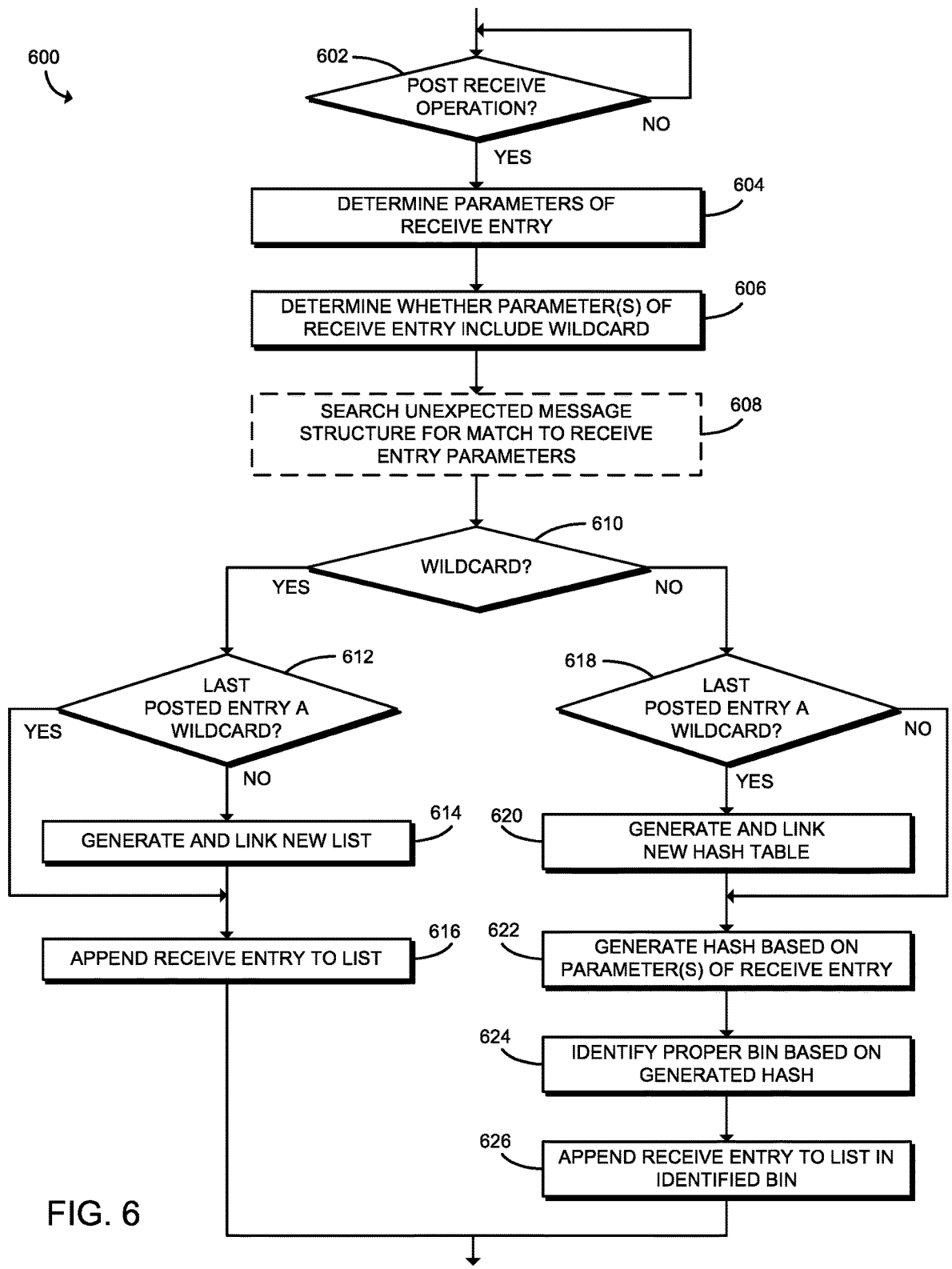
FIG. 6 is a simplified flow diagram of at least one other embodiment for performing a post of a receive operation.

Referring now to FIG. 6, in use, the compute node 102 may execute a method 600 for performing a post of a receive operation. The illustrative method 600 begins with block 602 in which the compute node 102 determines whether to perform a post of a receive operation. If so, in block 604, the compute node 102 determines the parameters of the receive entry and, in block 606, the compute node 102 determines whether the parameters of the receive entry include a wildcard. In block 608, the compute node 102 may search the unexpected message data structure 212 to determine whether any of the already-stored messages have parameters that match the parameters of the receive entry. In some embodiments, to do so, the compute node 102 may execute the method 400 of FIG. 4 as described above.

If the compute node 102 determines, in block 610, that the parameters of the receive entry include a wildcard, the compute node 102 determines, in block 612, whether the last-posted entry to the posted receive data structure 210 was also a wildcard. If not, in block 614, the compute node 102 generates a new linked list and links that list to the data structure (e.g., a hash table) including the last-posted entry. In block 616, the compute node 102 appends the receive entry to the linked list (i.e., the new list or the old list if the last-posted entry was a wildcard).

Returning to block 610, the compute node 102 determines that the parameters of the receive entry do not include a wildcard, the compute node 102 determines, in block 618, whether the last-posed entry to the posted receive data structure 210 was a wildcard. If so, in block 620, the compute node 102 generates a new hash table and links that hash table to the data structure (e.g., a linked list of wildcard values) including the last-posted entry. In block 622, the compute node 102 generates a hash based on the parameters of the receive entry. As indicated above, the compute node 102 may utilize any suitable hash algorithm and number of bins for doing so. In block 624, the compute node 102 identifies the proper bin of the hash table (i.e., the new hash table or the old hash table if the last-posted entry was not a wildcard) based on the generated hash. In block 626, the compute node 102 appends the receive entry to the list in the identified bin of the hash table. It should be appreciated that the compute node 102 may generate a linked list or hash table for the first-posted receive entry depending on whether the parameters of that entry include a wildcard as described above.

Figure 7:
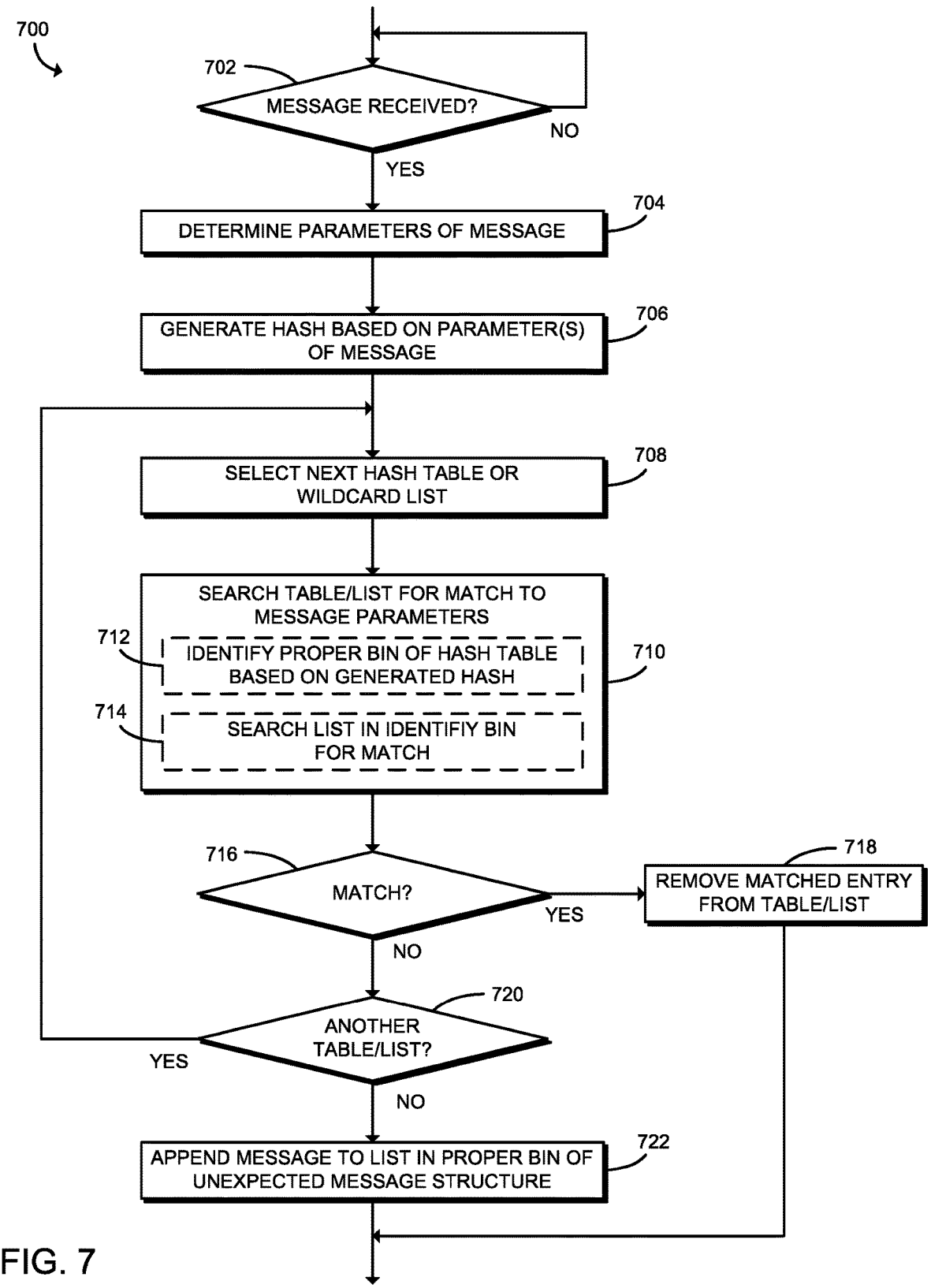
FIG. 7 is a simplified flow diagram of at least one other embodiment for processing a received message.

Referring now to FIG. 7, in use, the compute node 102 may execute a method 700 for processing a received message. The illustrative method 700 begins with block 702 in which the compute node 102 determines whether a message has been received. If so, the compute node 102 determines the parameters of the message in block 704 and generates a hash based on the parameters of the message in block 706. In block 708, the compute node 102 selects the next hash table or wildcard list in the posted receive data structure 210. It should be appreciated that, in some embodiments, the posted received data structure 210 of FIGS. 6-7 includes a set of hash tables and linked lists (for wildcards) that are linked to one another in a manner that preserves the proper order of those entries. As such, on the first iteration of block 708, the compute node 102 selects the first (and therefore oldest) hash table or wildcard list in the data structure 210.

In block 710, the compute node 102 searches the selected hash table or wildcard list to determine whether any of the entries has parameters that match those of the received message. In embodiments in which a hash table has been selected, in block 712, the compute node 102 may identify the proper bin of the hash table based on the generated hash and, in block 714, the compute node 102 may search the list in the identified bin for the match. It should be appreciated that doing so reduces the search scope.

In block 716, the compute node 102 determines whether a match has been identified. If so, in block 718, the compute node 102 removes the matched entry from the corresponding hash table or list. Of course, the compute node 102 may "repair" the table/list accordingly. For example, in some embodiments, the compute node 102 may remove "stale" table/list entries, merge adjacent hash tables/lists, and/or perform other suitable repair/maintenance functions. However, if the compute node 102 determines that no match has been identified, the compute node 102 determines, in block 720, whether to select another hash table or list. In particular, in the illustrative embodiment, the compute node 102 determines whether any hash tables or wildcard lists remain in the posted receive data structure 210 that have not already been searched. If so, the method 700 returns to block 708 in which the compute node 102 selects the next hash table or wildcard list. Otherwise, the method 700 advances to block 722 in which the compute node 102 appends the received message to the list in the proper bin (based on the hash) of the unexpected message data structure 212 as described above.

Referring now to FIG. 8, at least one embodiment of a posted receive data structure 800 is shown. It should be appreciated that, in some embodiments, the data structure 800 may be used as the data structure 210 in conjunction with the method 300 of FIG. 3. As shown in FIG. 8, the data structure 800 includes four bins (bin 0, bin 1, bin 2, and bin 3) and a wildcard list. In the illustrative embodiment, the compute node 102 generated the hash values according to hash(c,s,t)=(c+s+t)%4 and stored ten receive entries accordingly. Additionally, nine wildcard markers were appended at various points to account for wildcards identified in parameters of the receive entries. It should be appreciated that, for illustrative purposes, FIG. 8 shows sequence numbers 1-10 indicative of an order in which those receive entries are appended to the data structure 800.

More specifically, the first entry (0,3,0) is hashed to get a hash value of 3 and therefore appended to bin 3. The second entry (0,1,0) is hashed to get a hash value of 1 and therefore appended to bin 1. The third entry (1,1,1) results in a hash value of 3 and is appended to bin 3. The fourth entry (0,*,1) has a wildcard parameter. As such, wildcard markers are added to each of the bins (bin 0, bin 1, bin 2, and bin 3) as well as the wildcard list. Then, the fourth entry is appended to the wildcard list. The fifth entry (0,*,*) also has a wildcard parameter. However, because the previous entry (the fourth entry) also had a wildcard entry, it is unnecessary to add another marker. As such, the fifth entry is appended to the wildcard list. The sixth entry (0,3,2) has a hash value of 1 and is therefore added to the list of bin 1. The seventh entry (1,3,0) has a hash value of 0 and is appended to the list of bin 0. The eighth entry (0,3,*) is another entry that has a wildcard parameter. Because the previous entry had no wildcards, wildcard markers are added to the bins and wildcard list, and the eighth entry is subsequently added to the wildcard list. The ninth entry (0,0,0) has a hash value of 0 and is added to the list of bin 0. Lastly, the tenth entry (0,1,4) hashes to 1 and is therefore added to bin 1.

It should be appreciated that senders cannot specify a wildcard in a transmitted message, so searches through the data structure 800 are performed using a (c, s, t) parameter three-tuple that contains no wildcards in the illustrative embodiment. During a search, the proper bin to search is identified based on a hash of the corresponding entry and both the selected bin and the wildcard list are searched (e.g., in parallel). In some embodiments, two wildcard counters may be initialized to zero and maintained—one for the selected bin's list and one for the wildcard list. As wildcard markers are encountered, the corresponding wildcard counter is incremented, effectively counting how many wildcard markers have been encountered in the list up to that point. When matching entries are found in multiple lists (i.e., both the selected bin list and the wildcard list), the descriptor in the list with the smallest counter value (and therefore oldest entry) is selected. If the values are equal, the wildcard descriptor is selected. For example, suppose the entry (0,0,0) is searched in the data structure 800. Because that entry hashes to zero, bin 0 and the wildcard list are searched (e.g., simultaneously). It should be appreciated that the search of bin zero results in that wildcard counter (WC) being incremented to WC=2, because two wildcard markers are encountered before matching the ninth entry. During the search through the wildcard list, one wildcard marker is encountered before matching the fifth entry, so that wildcard counter is incremented to WC=1. As such, the matching entry in the wildcard list is selected (i.e., the fifth entry). It should be further appreciated that the wildcard markers may be occasionally removed if a wildcard marker is present at the head of every bin.

Referring now to FIG. 9, at least one embodiment of a posted receive data structure 900 is shown. It should be appreciated that the data structure 900 is similar to the data structure 800 except that the wildcard markers have been replaced with wildcard counters stored to each of the entries as descriptors. Each of the wildcard counters is indicative of a number of wildcard markers that would have been added to the corresponding list prior to encountering that particular entry. For example, the seventh entry has a wildcard counter WC=1, which indicates that one wildcard transition occurred prior appending that entry.

Figure 10:
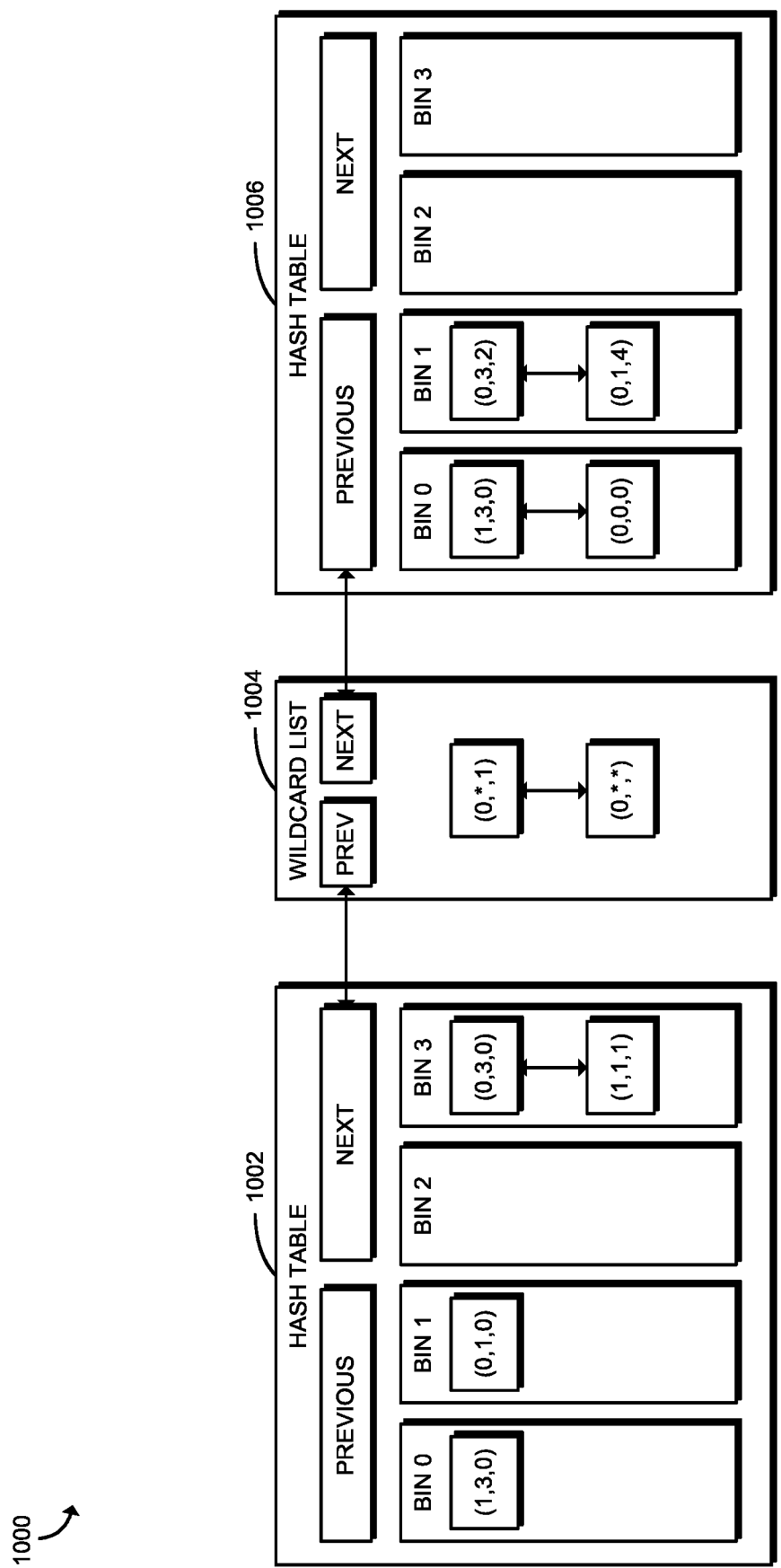

Referring now to FIG. 10, at least one other embodiment of a posted receive data structure 1000 is shown. It should be appreciated that, in some embodiments, the data structure 1000 may be used as the data structure 210 in conjunction with the method 600 of FIG. 6. As shown in FIG. 10, the data structure 1000 includes a hash table 1002 with four bins linked/appended to a wildcard list 1004, which is in turn linked/appended to another hash table 1006 with four bins. As shown, the data structure 1000 is ordered at two levels. That is, the entries in the hash tables 1002, 1006 and the list 1004 are ordered within themselves. Additionally, the hash tables 1002, 1006 and the list are ordered in relation to one another. As shown in FIG. 10, it should be appreciated that four entries are added to the corresponding bins of the hash table 1002. When an entry (0,*,1) with a wildcard is encountered, the compute node 102 creates the wildcard list 1004 to store the wildcard and any immediately subsequent wildcards and links that list 1004 to the table 1002. When the entry (1,3,0) is encountered, the compute node 102 determines that a transition has occurred and may generate a new hash table 1006 and link it to the list 1004 (e.g., depending on a detected or anticipated usage model). During a search, the data structure 1000 may be searched sequentially such that the hash table 1002 is searched first (i.e., the corresponding bin), then the wildcard list 1004 is searched, and then the hash table 1006 is searched, and so on. It should be appreciated that, in some embodiments, the hash tables of the data structure 1000 may be executed in hardware.

Figure 11:
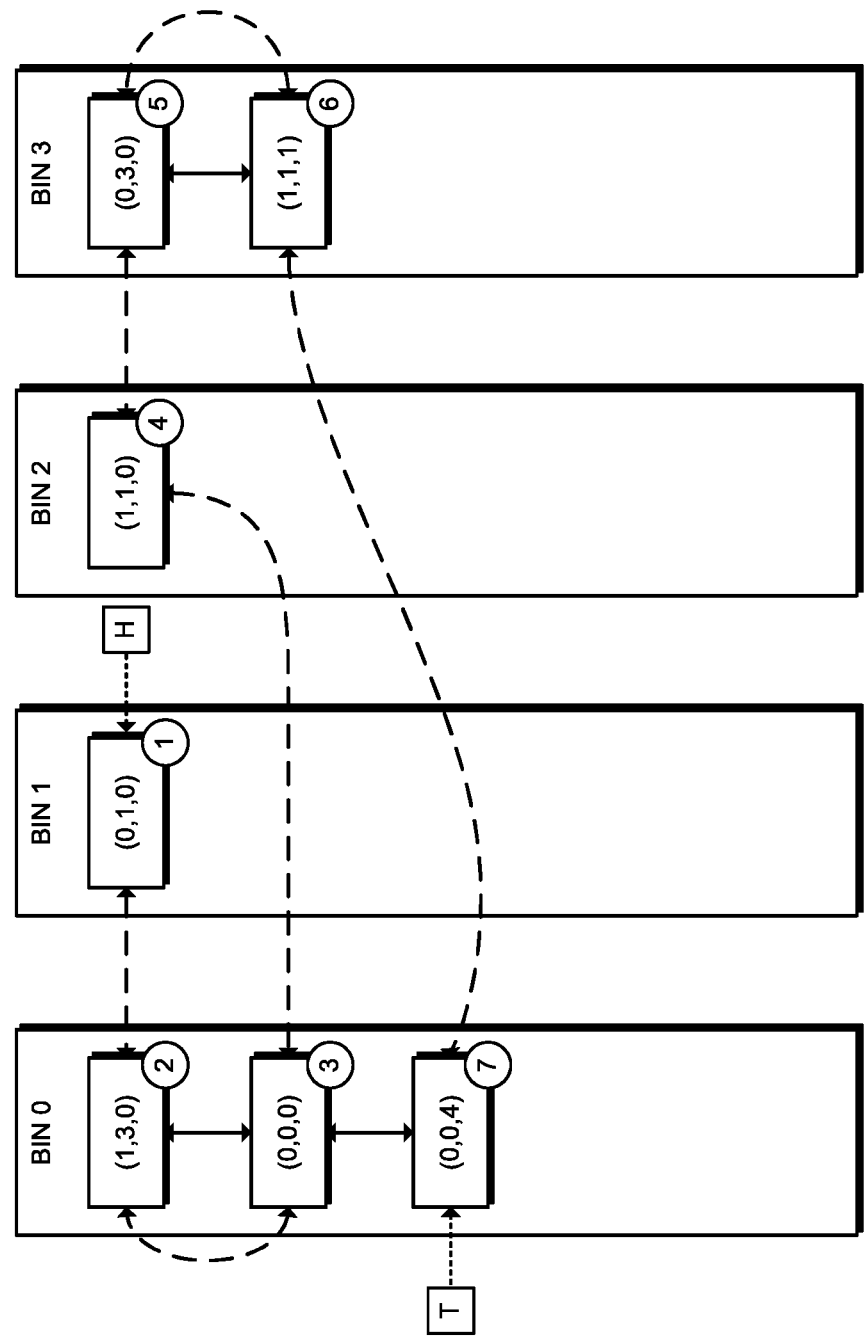
FIG. 11 is a simplified block diagram of at least one embodiment of an unexpected message data structure.

Referring now to FIG. 11, at least one other embodiment of an unexpected message data structure 1100 is shown. In some embodiments, the data structure 1100 may be utilized as the data structure 212. As shown, the data structure 1100 includes four bins but does not include a wildcard list; as indicated above, messages received from a sender cannot have wildcard values. It should be appreciated that the illustrative data structure 1100 preserves order within each of the bins and maintains a global list, which is identifiable in FIG. 11 as a dashed line. As described above, in embodiments in which a receive entry to be compared against the data structure 1100 includes a wildcard parameter, the compute node 102 uses the global list to make that comparison. Otherwise, the compute node 102 may hash the receive entry and perform the search by looking through the corresponding bin. It should be appreciated that the data structure 1100 may include a head pointer (denoted by "H" in FIG. 11) that points to or otherwise identifies the first entry in the global list and a tail pointer (denoted by "T") that points to or otherwise identifies the last entry in the global list. Such pointers may be used, for example, to identify a starting point when searching and/or an ending point to which to append new entries.

EXAMPLES

Illustrative examples of the technologies disclosed herein are provided below. An embodiment of the technologies may include any one or more, and any combination of, the examples described below.

Example 1 includes a compute node for handling message passing interface receive operations, the compute node comprising a posting circuitry to (i) determine a plurality of parameters of a receive entry to be posted and (ii) determine whether the plurality of parameters includes a wildcard entry; and a hash circuitry to generate a hash based on at least one parameter of the plurality of parameters in response to a determination that the plurality of parameters does not include the wildcard entry; wherein the posting circuitry is further to (i) append the receive entry to a list in a bin of a posted receive data structure, wherein the bin is determined based on the generated hash, (ii) track the wildcard entry in the posted receive data structure in response to a determination that the plurality of parameters includes the wildcard entry, and (iii) append the receive entry to a wildcard list of the posted receive data structure in response to generation of a track of the wildcard entry.

Example 2 includes the subject matter of Example 1, and wherein the plurality of parameters comprises a message passing interface (MPI) communicator, a source rank, and a tag.

Example 3 includes the subject matter of any of Examples 1 and 2, and wherein to generate the hash comprises to generate a hash based on a number of bins in the posted receive data structure and at least one of a communicator value, a source rank value, or a tag value of the plurality of parameters.

Example 4 includes the subject matter of any of Examples 1-3, and wherein to generate the hash comprises to generate a hash according to hash(c,s,t)=(c+s+t)%bins, wherein c is the communicator value of the plurality of parameters; s is the source rank value of the plurality of parameters; t is the tag value of the plurality of parameters; % is a modulo operator; and bins is a number of bins in the posted receive data structure.

Example 5 includes the subject matter of any of Examples 1-4, and wherein to generate the hash comprises to generate a hash according to hash(c,s,t)=(c+s+t)&bin_mask, wherein c is the communicator value of the plurality of parameters; s is the source rank value of the plurality of parameters; t is the tag value of the plurality of parameters; & is a bitwise and operator; and bin_mask is one less than a number of bins in the posted receive data structure.

Example 6 includes the subject matter of any of Examples 1-5, and wherein to track the wildcard entry comprises to append a wildcard marker to a list of each bin of the posted receive data structure and the wildcard list.

Example 7 includes the subject matter of any of Examples 1-6, and wherein to track the wildcard entry comprises to increment a wildcard counter, wherein a separate wildcard counter value is stored in a descriptor for each entry of the posted receive data structure.

Example 8 includes the subject matter of any of Examples 1-7, and wherein the posting circuitry is further to (i) determine whether a message is buffered in an unexpected message data structure and (ii) search the unexpected message data structure for a match to the receive entry in response to a determination that the message is buffered, wherein the unexpected message data structure stores messages received by the compute node prior to a corresponding posted receive operation.

Example 9 includes the subject matter of any of Examples 1-8, and wherein to search the unexpected message data structure comprises to search a list in a bin of the unexpected message data structure in response to a determination that the plurality of parameters does not include the wildcard entry; and wherein the bin is determined based on the generated hash.

Example 10 includes the subject matter of any of Examples 1-9, and wherein to search the unexpected message data structure comprises to remove the receive entry from the list in response to identification of the match.

Example 11 includes the subject matter of any of Examples 1-10, and wherein to search the unexpected message data structure comprises to search a global list of the unexpected message data structure for the match to the receive entry in response to a determination that the plurality of parameters includes the wildcard entry.

Example 12 includes the subject matter of any of Examples 1-11, and wherein to search the unexpected message data structure comprises to remove the receive entry from the global list in response to identification of the match.

Example 13 includes the subject matter of any of Examples 1-12, and wherein the posting circuitry is to remove the receive entry from the list in the bin of the posted receive data structure in response to identification of the match.

Example 14 includes the subject matter of any of Examples 1-13, and further including a communication circuitry to receive, from a remote compute node over a network, a message that corresponds with creation of the receive entry.

Example 15 includes a method for handling message passing interface receive operations, the method comprising determining, by a compute node, a plurality of parameters of a receive entry to be posted; determining, by the compute node, whether the plurality of parameters includes a wildcard entry; generating, by the compute node, a hash based on at least one parameter of the plurality of parameters in response to determining that the plurality of parameters does not include the wildcard entry; appending, by the compute node, the receive entry to a list in a bin of a posted receive data structure, wherein the bin is determined based on the generated hash; tracking, by the compute node, the wildcard entry in the posted receive data structure in response to determining the plurality of parameters includes the wildcard entry; and appending, by the compute node, the receive entry to a wildcard list of the posted receive data structure in response to tracking the wildcard entry.

Example 16 includes the subject matter of Example 15, and wherein the plurality of parameters comprises a message passing interface (MPI) communicator, a source rank, and a tag.

Example 17 includes the subject matter of any of Examples 15 and 16, and wherein generating the hash comprises generating a hash based on a number of bins in the posted receive data structure and at least one of a communicator value, a source rank value, or a tag value of the plurality of parameters.

Example 18 includes the subject matter of any of Examples 15-17, and wherein generating the hash comprises generating a hash according to hash(c,s,t)=(c+s+t)%bins, wherein c is the communicator value of the plurality of parameters; s is the source rank value of the plurality of parameters; t is the tag value of the plurality of parameters; % is a modulo operator; and bins is a number of bins in the posted receive data structure.

Example 19 includes the subject matter of any of Examples 15-18, and wherein generating the hash comprises generating a hash according to hash(c,s,t)=(c+s+t)&bin_mask, wherein c is the communicator value of the plurality of parameters; s is the source rank value of the plurality of parameters; t is the tag value of the plurality of parameters; & is a bitwise and operator; and bin_mask is one less than a number of bins in the posted receive data structure.

Example 20 includes the subject matter of any of Examples 15-19, and wherein tracking the wildcard entry comprises appending a wildcard marker to a list of each bin of the posted receive data structure and the wildcard list.

Example 21 includes the subject matter of any of Examples 15-20, and wherein tracking the wildcard entry comprises incrementing a wildcard counter, wherein a separate wildcard counter value is stored in a descriptor for each entry of the posted receive data structure.

Example 22 includes the subject matter of any of Examples 15-21, and further including determining, by the compute node, whether a message is buffered in an unexpected message data structure; and searching, by the compute node, the unexpected message data structure for a match to the receive entry in response to determining the message is buffered, wherein the unexpected message data structure stores messages received by the compute node prior to a corresponding posted receive operation.

Example 23 includes the subject matter of any of Examples 15-22, and wherein searching the unexpected message data structure comprises searching a list in a bin of the unexpected message data structure in response to determining that the plurality of parameters does not include the wildcard entry; and wherein the bin is determined based on the generated hash.

Example 24 includes the subject matter of any of Examples 15-23, and wherein searching the unexpected message data structure comprises removing the receive entry from the list in response to identifying the match.

Example 25 includes the subject matter of any of Examples 15-24, and wherein searching the unexpected message data structure comprises searching a global list of unexpected message data structure for the match to the receive entry in response to determining the plurality of parameters includes the wildcard entry.

Example 26 includes the subject matter of any of Examples 15-25, and wherein searching the unexpected message data structure comprises removing the receive entry from the global list in response to identifying the match.

Example 27 includes the subject matter of any of Examples 15-26, and further including removing the receive entry from the list in the bin of the posted receive data structure in response to identifying the match.

Example 28 includes the subject matter of any of Examples 15-27, and further including receiving, by the compute node and from a remote compute node over a network, a message that corresponds with creation of the receive entry.

Example 29 includes a computing device comprising a processor; and a memory having stored therein a plurality of instructions that when executed by the processor cause the computing device to perform the method of any of Examples 15-28.

Example 30 includes one or more machine-readable storage media comprising a plurality of instructions stored thereon that, in response to being executed, result in a computing device performing the method of any of Examples 15-28.

Example 31 includes a computing device comprising means for performing the method of any of Examples 15-28.

Example 32 includes a compute node for handling messages received by a message passing interface (MPI) of the compute node, the compute node comprising an incoming message handling circuitry to determine a plurality of parameters of a message received by the compute node; and a hash circuitry to generate a hash based on at least one parameter of the plurality of parameters; wherein the incoming message handling circuitry is further to (i) search a list in a bin of a posted receive data structure for an oldest match to the plurality of parameters of the message, wherein the bin is determined based on the generated hash, (ii) search a wildcard list of the posted receive data structure for an oldest match to the plurality of parameters of the message, and (iii) remove a posted receive entry from the posted receive data structure in response to identification of a match between parameters of the posted receive entry and the plurality of parameters of the message.

Example 33 includes the subject matter of Example 32, and wherein to search the list comprises to increment a first wildcard counter for each wildcard marker encountered in the list before reading the posted receive entry; wherein to search the wildcard list comprises to increment a second wildcard counter for each wildcard marker encountered in the list before reading the posted receive entry; and wherein the incoming message handling circuitry is further to compare the first wildcard counter to the second wildcard counter.

Example 34 includes the subject matter of any of Examples 32 and 33, and wherein to remove the posted receive entry comprises to remove the posted receive entry from the list in response to a determination that the first wildcard counter has a value less than a value of the second wildcard counter.

Example 35 includes the subject matter of any of Examples 32-34, and wherein to remove the posted receive entry comprises to remove the posted receive entry from the wildcard list in response to a determination that the second wildcard counter has a value less than or equal to a value of the first wildcard counter.

Example 36 includes the subject matter of any of Examples 32-35, and wherein the incoming message handling circuitry is further to append the message to a list of an unexpected message data structure in response to a determination that the plurality of parameters do not match parameters of any posted receive entries of the posted receive data structure.

Example 37 includes a method for handling messages received by a message passing interface (MPI) of a compute node, the method comprising determining, by the compute node, a plurality of parameters of a message received by the compute node; generating, by the compute node, a hash based on at least one parameter of the plurality of parameters; searching, by the compute node, a list in a bin of a posted receive data structure for an oldest match to the plurality of parameters of the message, wherein the bin is determined based on the generated hash; searching, by the compute node, a wildcard list of the posted receive data structure for an oldest match to the plurality of parameters of the message; and removing, by the compute node, a posted receive entry from the posted receive data structure in response to identifying a match between parameters of the posted receive entry and the plurality of parameters of the message.

Example 38 includes the subject matter of Example 37, and wherein searching the list comprises incrementing a first wildcard counter for each wildcard marker encountered in the list before reading the posted receive entry; wherein searching the wildcard list comprises incrementing a second wildcard counter for each wildcard marker encountered in the list before reading the posted receive entry; and further comprising comparing the first wildcard counter to the second wildcard counter.

Example 39 includes the subject matter of any of Examples 37 and 38, and wherein removing the posted receive entry comprises removing the posted receive entry from the list in response to determining the first wildcard counter has a value less than a value of the second wildcard counter.

Example 40 includes the subject matter of any of Examples 37-39, and wherein removing the posted receive entry comprises removing the posted receive entry from the wildcard list in response to determining the second wildcard counter has a value less than or equal to a value of the first wildcard counter.

Example 41 includes the subject matter of any of Examples 37-40, and further including appending, by the compute node, the message to a list of an unexpected message data structure in response to determining that the plurality of parameters do not match parameters of any posted receive entries of the posted receive data structure.

Example 42 includes a computing device comprising a processor; and a memory having stored therein a plurality of instructions that when executed by the processor cause the computing device to perform the method of any of Examples 37-41.

Example 43 includes one or more machine-readable storage media comprising a plurality of instructions stored thereon that, in response to being executed, result in a computing device performing the method of any of Examples 37-41.

Example 44 includes a computing device comprising means for performing the method of any of Examples 37-41.

Example 45 includes a compute node for handling message passing interface receive operations, the compute node comprising means for determining a plurality of parameters of a receive entry to be posted; means for determining whether the plurality of parameters includes a wildcard entry; means for generating a hash based on at least one parameter of the plurality of parameters in response to determining that the plurality of parameters does not include the wildcard entry; means for appending the receive entry to a list in a bin of a posted receive data structure, wherein the bin is determined based on the generated hash; means for tracking the wildcard entry in the posted receive data structure in response to determining the plurality of parameters includes the wildcard entry; and means for appending the receive entry to a wildcard list of the posted receive data structure in response to tracking the wildcard entry.

Example 46 includes the subject matter of Example 45, and wherein the plurality of parameters comprises a message passing interface (MPI) communicator, a source rank, and a tag.

Example 47 includes the subject matter of any of Examples 45 and 46, and wherein the means for generating the hash comprises means for generating a hash based on a number of bins in the posted receive data structure and at least one of a communicator value, a source rank value, or a tag value of the plurality of parameters.

Example 48 includes the subject matter of any of Examples 45-47, and wherein the means for generating the hash comprises means for generating a hash according to hash(c,s,t)=(c+s+t)%bins, wherein c is the communicator value of the plurality of parameters; s is the source rank value of the plurality of parameters; t is the tag value of the plurality of parameters; % is a modulo operator; and bins is a number of bins in the posted receive data structure.

Example 49 includes the subject matter of any of Examples 45-48, and wherein the means for generating the hash comprises means for generating a hash according to hash(c,s,t)=(c+s+t)&bin_mask, wherein c is the communicator value of the plurality of parameters; s is the source rank value of the plurality of parameters; t is the tag value of the plurality of parameters; & is a bitwise and operator; and bin_mask is one less than a number of bins in the posted receive data structure.

Example 50 includes the subject matter of any of Examples 45-49, and wherein the means for tracking the wildcard entry comprises means for appending a wildcard marker to a list of each bin of the posted receive data structure and the wildcard list.

Example 51 includes the subject matter of any of Examples 45-50, and wherein the means for tracking the wildcard entry comprises means for incrementing a wildcard counter, wherein a separate wildcard counter value is stored in a descriptor for each entry of the posted receive data structure.

Example 52 includes the subject matter of any of Examples 45-51, and further including means for determining whether a message is buffered in an unexpected message data structure; and means for searching the unexpected message data structure for a match to the receive entry in response to determining the message is buffered, wherein the unexpected message data structure stores messages received by the compute node prior to a corresponding posted receive operation.

Example 53 includes the subject matter of any of Examples 45-52, and wherein the means for searching the unexpected message data structure comprises means for searching a list in a bin of the unexpected message data structure in response to determining that the plurality of parameters does not include the wildcard entry; and wherein the bin is determined based on the generated hash.

Example 54 includes the subject matter of any of Examples 45-53, and wherein the means for searching the unexpected message data structure comprises means for removing the receive entry from the list in response to identifying the match.

Example 55 includes the subject matter of any of Examples 45-54, and wherein the means for searching the unexpected message data structure comprises means for searching a global list of unexpected message data structure for the match to the receive entry in response to determining the plurality of parameters includes the wildcard entry.

Example 56 includes the subject matter of any of Examples 45-55, and wherein the means for searching the unexpected message data structure comprises means for removing the receive entry from the global list in response to identifying the match.

Example 57 includes the subject matter of any of Examples 45-56, and further including means for removing the receive entry from the list in the bin of the posted receive data structure in response to identifying the match.

Example 58 includes the subject matter of any of Examples 45-57, and further including means for receiving, from a remote compute node over a network, a message that corresponds with creation of the receive entry.

Example 59 includes a compute node for handling messages received by a message passing interface (MPI) of the compute node, the compute node comprising means for determining a plurality of parameters of a message received by the compute node; means for generating a hash based on at least one parameter of the plurality of parameters; means for searching a list in a bin of a posted receive data structure for an oldest match to the plurality of parameters of the message, wherein the bin is determined based on the generated hash; means for searching a wildcard list of the posted receive data structure for an oldest match to the plurality of parameters of the message; and means for removing a posted receive entry from the posted receive data structure in response to identifying a match between parameters of the posted receive entry and the plurality of parameters of the message.

Example 60 includes the subject matter of Example 59, and wherein the means for searching the list comprises means for incrementing a first wildcard counter for each wildcard marker encountered in the list before reading the posted receive entry; wherein the means for searching the wildcard list comprises means for incrementing a second wildcard counter for each wildcard marker encountered in the list before reading the posted receive entry; and further comprising means for comparing the first wildcard counter to the second wildcard counter.

Example 61 includes the subject matter of any of Examples 59 and 60, and wherein the means for removing the posted receive entry comprises means for removing the posted receive entry from the list in response to determining the first wildcard counter has a value less than a value of the second wildcard counter.

Example 62 includes the subject matter of any of Examples 59-61, and wherein the means for removing the posted receive entry comprises means for removing the posted receive entry from the wildcard list in response to determining the second wildcard counter has a value less than or equal to a value of the first wildcard counter.

Example 63 includes the subject matter of any of Examples 59-62, and further including means for appending the message to a list of an unexpected message data structure in response to determining that the plurality of parameters do not match parameters of any posted receive entries of the posted receive data structure.

The invention claimed is:

1. A compute node for handling message passing interface receive operations, the compute node comprising:
 a posting circuitry to (i) determine a plurality of parameters of a receive entry to be posted and (ii) determine whether the plurality of parameters includes a wildcard entry; and
 a hash circuitry to generate a hash based on at least one parameter of the plurality of parameters and on a number of bins in a posted receive data structure in response to a determination that the plurality of parameters does not include the wildcard entry;
 wherein the posting circuitry is further to (i) append the receive entry to a list in a bin of the posted receive data structure, wherein the bin is determined based on the generated hash, (ii) track the wildcard entry in the posted receive data structure in response to a determination that the plurality of parameters includes the wildcard entry, and (iii) append the receive entry to a wildcard list of the posted receive data structure in response to generation of a track of the wildcard entry, wherein to track the wildcard entry comprises to append a wildcard marker to a list of each bin of the posted receive data structure and the wildcard list.

2. The compute node of claim 1, wherein the plurality of parameters comprises a message passing interface (MPI) communicator, a source rank, and a tag.

3. The compute node of claim 1, wherein to generate the hash comprises to generate a hash based on the number of bins in the posted receive data structure and at least one of a communicator value, a source rank value, or a tag value of the plurality of parameters.

4. The compute node of claim 3, wherein to generate the hash comprises to generate a hash according to hash(c,s,t)= (c+s+t)%bins, wherein:
 c is the communicator value of the plurality of parameters;
 s is the source rank value of the plurality of parameters;
 t is the tag value of the plurality of parameters;
 % is a modulo operator; and
 bins is the number of bins in the posted receive data structure.

5. The compute node of claim 3, wherein to generate the hash comprises to generate a hash according to hash(c,s,t)= (c+s+t)&bin_ mask, wherein:
 c is the communicator value of the plurality of parameters;
 s is the source rank value of the plurality of parameters;
 t is the tag value of the plurality of parameters;
 & is a bitwise and operator; and
 bin_mask is one less than the number of bins in the posted receive data structure.

6. The compute node of claim 1, wherein to track the wildcard entry comprises to increment a wildcard counter, wherein a separate wildcard counter value is stored in a descriptor for each entry of the posted receive data structure.

7. The compute node of claim 1, wherein the posting circuitry is further to (i) determine whether a message is buffered in an unexpected message data structure and (ii) search the unexpected message data structure for a match to the receive entry in response to a determination that the message is buffered,
 wherein the unexpected message data structure stores messages received by the compute node prior to a corresponding posted receive operation.

8. The compute node of claim 7, wherein to search the unexpected message data structure comprises to (i) search a list in a bin of the unexpected message data structure in response to a determination that the plurality of parameters does not include the wildcard entry and (ii) remove the receive entry from the list in response to identification of the match; and
 wherein the bin is determined based on the generated hash.

9. The compute node of claim 7, wherein to search the unexpected message data structure comprises to (i) search a global list of the unexpected message data structure for the match to the receive entry in response to a determination that the plurality of parameters includes the wildcard entry and (ii) remove the receive entry from the global list in response to identification of the match; and
 wherein the posting circuitry is to remove the receive entry from the list in the bin of the posted receive data structure in response to identification of the match.

10. The compute node of claim 1, further comprising a communication circuitry to receive, from a remote compute node over a network, a message that corresponds with creation of the receive entry.

11. One or more non-transitory machine-readable storage media comprising a plurality of instructions stored thereon that, in response to execution by a computing device, cause the computing device to:
 determine a plurality of parameters of a receive entry to be posted;
 determine whether the plurality of parameters includes a wildcard entry;
 generate a hash based on at least one parameter of the plurality of parameters and on a number of bins in a posted receive data structure in response to a determination that the plurality of parameters does not include the wildcard entry;
 append the receive entry to a list in a bin of the posted receive data structure, wherein the bin is determined based on the generated hash;
 track the wildcard entry in the posted receive data structure in response to a determination that the plurality of parameters includes the wildcard entry, wherein to track the wildcard entry comprises to append a wildcard marker to a list of each bin of the posted receive data structure and the wildcard list; and
 append the receive entry to a wildcard list of the posted receive data structure in response to tracking the wildcard entry.

12. The one or more non-transitory machine-readable storage media of claim 11, wherein the plurality of parameters comprises a message passing interface (MPI) communicator, a source rank, and a tag.

13. The one or more non-transitory machine-readable storage media of claim 11, wherein to generate the hash comprises to generate a hash based on the number of bins in the posted receive data structure and at least one of a communicator value, a source rank value, or a tag value of the plurality of parameters.

14. The one or more non-transitory machine-readable storage media of claim 13, wherein to generate the hash comprises to generate a hash according to hash(c,s,t)=(c+s+t)%bins, wherein:

c is the communicator value of the plurality of parameters;
s is the source rank value of the plurality of parameters;
t is the tag value of the plurality of parameters;
% is a modulo operator; and
bins is the number of bins in the posted receive data structure.

15. The one or more non-transitory machine-readable storage media of claim 11, wherein to track the wildcard entry comprises to increment a wildcard counter, wherein a separate wildcard counter value is stored in a descriptor for each entry of the posted receive data structure.

16. The one or more non-transitory machine-readable storage media of claim 11, wherein the plurality of instructions further cause the computing device to:

determine whether a message is buffered in an unexpected message data structure; and
search the unexpected message data structure for a match to the receive entry in response to determining the message is buffered,
wherein the unexpected message data structure stores messages received by the compute device prior to a corresponding posted receive operation.

17. The one or more non-transitory machine-readable storage media of claim 16, wherein to search the unexpected message data structure comprises to:

search a list in a bin of the unexpected message data structure in response to a determination that the plurality of parameters does not include the wildcard entry; and
remove the receive entry from the list in response to identification of the match, wherein the bin is determined based on the generated hash.

18. The one or more non-transitory machine-readable storage media of claim 16, wherein to search the unexpected message data structure comprises to:

search a global list of unexpected message data structure for the match to the receive entry in response to a determination that the plurality of parameters includes the wildcard entry; and
remove the receive entry from the global list in response to identification of the match; and
wherein the plurality of instructions further cause the computing device to remove the receive entry from the list in the bin of the posted receive data structure in response to identification of the match.

19. A compute node for handling messages received by a message passing interface (MPI) of the compute node, the compute node comprising:

an incoming message handling circuitry to determine a plurality of parameters of a message received by the compute node; and
a hash circuitry to generate a hash based on at least one parameter of the plurality of parameters and on a number of bins in a posted receive data structure;
wherein the incoming message handling circuitry is further to (i) search a list in a bin of the posted receive data structure for an oldest match to the plurality of parameters of the message, wherein the bin is determined based on the generated hash, (ii) search a wildcard list of the posted receive data structure for a wildcard marker appended to the wildcard list, and (iii) remove a posted receive entry from the posted receive data structure in response to identification of a match between parameters of the posted receive entry and the plurality of parameters of the message.

20. The compute node of claim 19, wherein to search the list comprises to increment a first wildcard counter for each wildcard marker encountered in the list before reading the posted receive entry;

wherein to search the wildcard list comprises to increment a second wildcard counter for each wildcard marker encountered in the list before reading the posted receive entry; and
wherein the incoming message handling circuitry is further to compare the first wildcard counter to the second wildcard counter.

21. The compute node of claim 20, wherein to remove the posted receive entry comprises to remove the posted receive entry from the list in response to a determination that the first wildcard counter has a value less than a value of the second wildcard counter.

22. The compute node of claim 20, wherein to remove the posted receive entry comprises to remove the posted receive entry from the wildcard list in response to a determination that the second wildcard counter has a value less than or equal to a value of the first wildcard counter.

23. The compute node of claim 19, wherein the incoming message handling circuitry is further to append the message to a list of an unexpected message data structure in response to a determination that the plurality of parameters do not match parameters of any posted receive entries of the posted receive data structure.

* * * * *